Sept. 17, 1963  V. C. MARKLEY, JR  3,104,306
INSTANT HOT WATER DISPENSER
Filed Aug. 12, 1959
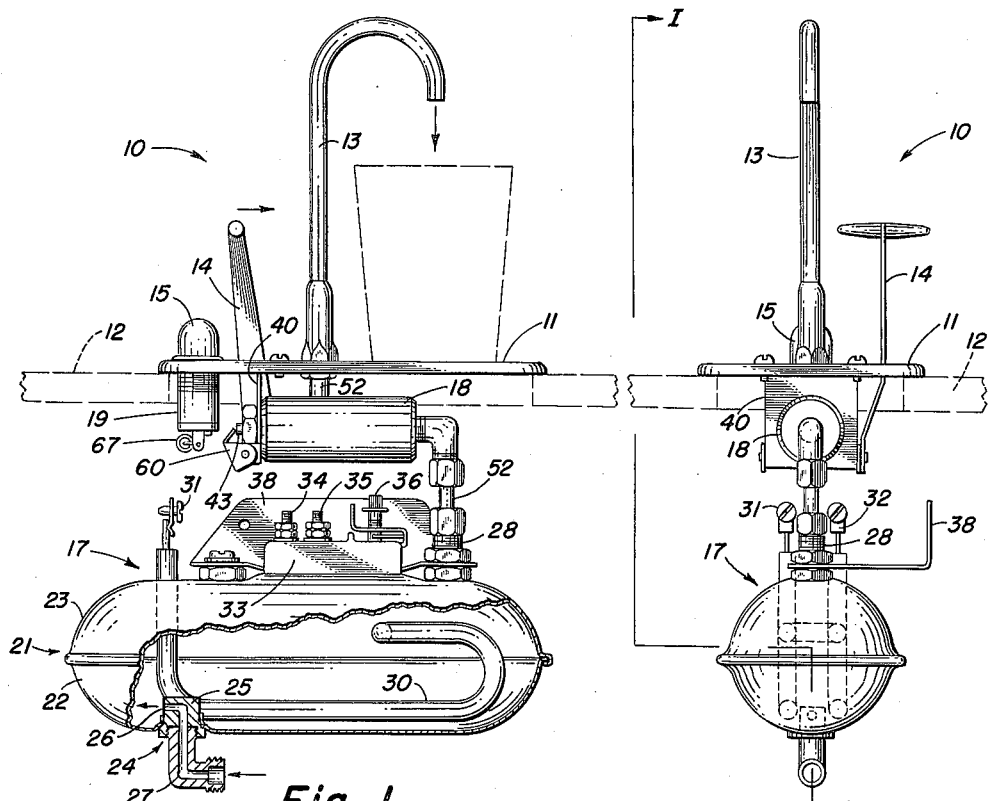
Fig. 1
Fig. 2
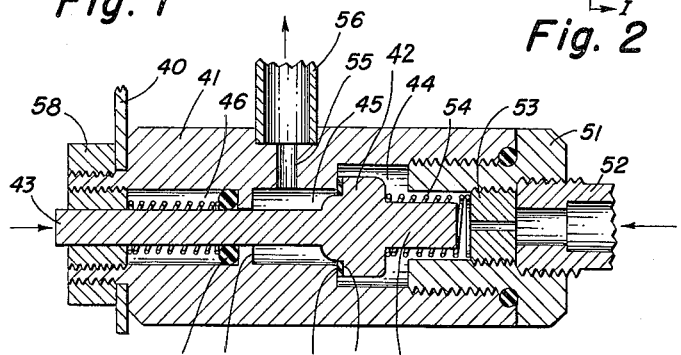
Fig. 3
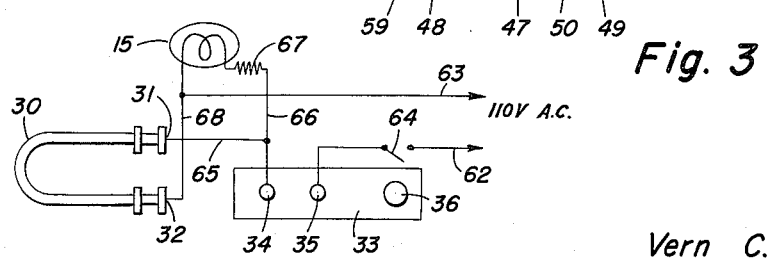
Fig. 4
INVENTOR
Vern C. Markley Jr.
BY Price & Heneveld
ATTORNEYS

United States Patent Office 3,104,306
Patented Sept. 17, 1963

3,104,306
INSTANT HOT WATER DISPENSER
Vern C. Markley, Jr., Grand Haven, Mich., assignor to Grand Haven Stamped Products Company, Grand Haven, Mich., a corporation of Michigan
Filed Aug. 12, 1959, Ser. No. 833,269
3 Claims. (Cl. 219—39)

This invention relates to a liquid dispenser. More particularly, it relates to a hot liquid dispenser especially useful in hotels, motels and the like in preparing hot drinks and beverages.

Many people on retiring at night and upon arising in the morning like to have a "quick" cup of coffee or a "quick" cup of tea. The facilities of hotels and motels, however, are not too convenient for fulfilling such desires. Usually, such persons, to satisfy their desires, must send out for these beverages, which are delivered by room service and the like.

With the advent of instant coffee, instant tea and packaged, dehydrated, cream and packaged sugar, it might be supposed that such desires could be fulfilled by merely using the hot water piped into the bathroom facilities in hotel and motel rooms. Unfortunately, in many hotels and motels, the water is either not hot enough or it takes too long for the hot water to reach the desired temperature by letting it run from the hot water tap. There is a need, therefore, for ways and means for supplying and dispensing hot water for the making of so-called "instant" beverages in hotels, motels and the like.

An object of this invention is to provide ways and means for dispensing hot water for the making of beverages.

A particular object of this invention is to provide a hot water dispenser which will rapidly heat one or two cups of hot water to the desired temperature, which will establish and maintain said volume of water at said temperature until dispensed and which has a quick recovery after said hot water has been dispensed.

Another specific object is to provide an instant hot water dispenser which can be installed in hotels, motels and the like by connecting the same to the cold water supply piping and to the electrical power supply, and be ready for instant use.

Another specific object of this invention is to provide an instant hot water dispenser which is of a simple but yet non-leaking construction and which is compact.

These and other objects which may appear as this specification proceeds are achieved by this invention which shall be described with reference to the drawings which form a material part of the disclosure.

A brief listing of the drawings follows.

FIG. 1 is a side view of a preferred embodiment of the instant hot water dispenser of this invention, which view is sectioned as indicated by the sectioning planes I—I of FIG. 2.

FIG. 2 is a front view of the hot water dispenser of FIG. 1.

FIG. 3 is a longitudinal sectional view of a preferred embodiment of the valve means employed in the dispenser of FIG. 1.

FIG. 4 is a schematic diagram of a preferred embodiment of the electrical circuitry involved in the dispenser of FIG. 1.

The compact, instant hot water, dispenser shown in the drawings is based on the broad concept of a tank of small capacity with an inlet and an outlet, a heating element in combination with said tank, a valve having an inlet and an outlet with the inlet coupled by way of a conduit with the outlet of said tank, and a dispenser nozzle coupled to the outlet of said valve.

Another concept involved in the dispenser shown in the drawings is that of an electrical heating element with a thermostatic control which, preferably, as adjustable.

Still another concept involved in the preferred embodiment is that of positioning the heating element inside the tank in the path of greatest flow of water from the tank inlet to the tank outlet. Embodied in this concept is a fluid inlet structure adapted to introduce cold water into the tank in a fashion to minimize, as much as possible, short circuiting thereof to the tank outlet.

In the preferred embodiment of this invention, the valve strucure is constructed to take advantage of hydrostatic pressure to establish and maintain the valve in normally closed position. Moreover, a valve spindle sealing structure is employed which assures, under normal operating conditions, no leakage of water from the valve.

Other concepts will be apparent in the detailed description of the drawings.

Structure

FIGS. 1 and 2 illustrate an instant hot water dispenser 10 having a normally horizontal base plate 11 for covering an opening in which the dispenser 10 is seated, which opening may be in a counter top 12 adjacent the bathroom sink or which opening may be in a wall cubicle in a convenient room location, preferably near the bathroom plumbing.

On top of the base plate 11 and extending downwardly therethrough are a discharge nozzle or spigot 13, a lever arm 14 and an indicator light 15.

Below the base plate 11 there is provided a hot water tank assembly 17, a valve 18, conduits between said tank assembly and said valve and between said valve and said discharge nozzle 13, and an indicator light socket 19.

The tank assembly 17 involves an oblong, somewhat sausage shaped, tank 21. The longitudinal axis of the tank is normally horizontally disposed. The tank 21 comprises a bottom member 22 and a top member 23 which are brazed together at their rims. Together, the bottom member 22 and the top member 23 form the top, bottom, ends and sides of the tank 21. In the region of one end of the tank 21, which end shall be referred to as the first end or inlet end of the tank 21, the bottom member 22 has, at the bottom thereof, a fluid inlet structure 24 which is best shown in FIG. 1. Inside the tank 21, the fluid inlet structure 24 comprises a closed end conduit 25 extending upwardly from the bottom of the bottom member 22 and having a lateral orifice 26 facing the inlet end of the tank 21. Outside the tank 21, the inlet conduit 25 is secured to a coupling such as an elbow coupling for connecting the dispenser 10 to a cold water supply pipe.

The top member 23 of the tank 21, in the region of the second or outlet end thereof, has an outlet in combination with conduit coupling 28. In the region of the inlet end or first end of the tank 21, the top member 23 is fitted with the two ends of a heating element 30 disposed within the tank 21. The two end portions of the heating element 30 project downwardly through seals into the interior of the tank 21 into the region of the bottom of the tank 21 on either side of the inlet conduit 25. In this region the two end portions of the heating element 30 merge into a pair of horizontally and longitudinally disposed portions which extend along the region of the tank bottom toward the outlet end of the tank, then curve upwardly into the region of the outlet of the tank and then extend longitudinally and horizontally in said region of the outlet toward the inlet end to join a common transverse portion. Outside the top member 23 of the tank 21, there are joined to the ends of the heating element 30 binding posts 31 and 32 (FIG. 2).

Between the ends of the heating element 30 and the outlet conduit coupling 28, there is mounted on the top member 23 an adjustable thermostat 33. The adjustable thermostat comprises a pair of binding posts 34 and 35 and a turning knob 36 for adjusting the action of the thermostat 33. The thermostat 33 is of a type which senses the temperature of the walls of the top member 23. Because of heat conductivity from the fluid in the tank 21 to the wall of the top member 23, there is a direct relationship between the temperature of the wall of the top member 23 and the fluid contents of the tank 21. When the temperature of the wall of the top member 23 has reached the point established by the turning knob 36, the thermostat 33 functions to open a switch internally connecting electrically the binding post 34 to the binding post 35.

Also secured to the top member 23 of the tank 21 is a mounting bracket 38. The mounting bracket may be used to mount the tank assembly 17 to an adjoining wall when the dispenser 10 is installed.

The valve 18 on the underside of the base plate 11 is mounted thereto by means of a bracket 40. The valve 18, as shown in FIG. 3, comprises a generally cylindrical valve housing 41. Within the housing is a valve body 42 with a spindle 43 extending therefrom along the longitudinal center line of the valve housing to a point outside one end of the valve housing. The valve housing 41 can be considered as having an inlet end and a spindle end. Inside the valve housing 41 and moving from the inlet end to the spindle end thereof, there is a first inner chamber 44, a second inner chamber 45 and a third or spindle end inner chamber 46. The first inner chamber 44 opens directly into the second inner chamber 45. However, the inner diameter of the second inner chamber 45 is less than that of the first inner chamber 44 and the change in diameter is quite abrupt whereby between the first inner chamber 44 and the second inner chamber 45 there is provided an annular shoulder or valve seat 47. Between the second inner chamber 45 and the third inner chamber 46, the valve housing 41 extends inwardly to form an annular shoulder or ring portion 48 through which the valve spindle 43 passes in sliding fit.

The valve body 42 is disposed in the first inner chamber 44. The valve body 42 comprises an annular portion having an outside diameter greater than the outside diameter of the second inner chamber 45 adjacent the valve seat 47 but less than the inner diameter of the first inner chamber 44 adjacent the valve seat 47. On the inlet end side of the valve body 42, there is provided a stud portion 49 which is of lesser outside diameter than the valve body 42 about the valve seat 47. On the spindle end side of the valve body 42, the spindle 43 merges into the valve body 42. On the face of the valve body normally in contact with the valve seat 47 there is provided a gasket 50 for preventing leakage past the valve body 42 and valve seat 47 from the first inner chamber 44 to the second inner chamber 45.

Threadedly engaged with the valve housing 41 at the inlet end thereof is an inlet end closure coupling structure 51. This structure comprises an inlet coupled to one end of conduit 52 which is coupled at the other end to the conduit coupling 28. Between the outlet end of the conduit 52 and the end of the stud member 49 there is provided a constricted orifice 53 which has a fluid passage therethrough which, in comparison to the first inner chamber 44 and the fluid passageway through the conduit 52, is constricted. The reason for the constricted orifice member 53 is to prevent the sudden spurt of liquid from the discharge nozzle 13 when the valve body 42 is unseated from the valve seat 47. The inner end of the constricted orifice member 53, it will be observed, is spaced from the end of the stud member 49 to permit passage of fluid from the orifice member 53 into the inner chamber 44. However, mounted on the stud 49 between the inlet side of the valve body 42 and the constricted orifice member 53 is a tension spring 54 which urges the valve body 42 into seating engagement with the valve seat 47.

The outlet of the valve 18 involves a transversely disposed passageway 55 through the valve housing 41. The inlet to the passageway 55 is located in the second inner chamber 45 on the downstream side of the valve seat 47. The outlet of the passageway 55 opens into an upwardly extending conduit 56 secured to the valve housing 41 as by brazing. The outlet conduit 56 is threadedly coupled to the discharge nozzle 13.

At the valve spindle end or second end of the valve housing 41 there is threadedly connected thereto, with the bracket 40 in between, an end closure structure 58. The valve spindle 43 extends through a suitable opening in the end closure structure 58 and outside thereof for a short distance. Inside the third inner chamber 46 and adjacent to the annular shoulder or ring portion 48, there is provided an O-ring 59. Between the O-ring and the end closure structure 58 there is provided a tension spring 60 which urges the O-ring 59 into sealing relationship with the housing 41, the ring portion 48 and the valve spindle 43.

The bottom end of the lever arm 14 is pivotally mounted on the bracket 40. Part of the lever arm 14 comprises a horizontally and transversely disposed strike bar 60 which, when the lever arm 14 is pulled forwardly, engages the end of the valve spindle 43 and depresses the same into the valve housing 41. In such manner, the valve 18 is opened to permit the flow of liquid from the tank 21 to the discharge nozzle 13.

The liquid dispenser 10 also comprises an electrical circuit for actuating the heating element 30 of the tank assembly 17. Such a circuit is shown in FIG. 4. This circuit involves a pair of lead lines 62 and 63 from a 110 volt A.C. source of electrical current. Lead line 62 has a wall switch 64 therein whereby the electrical current to the dispenser 10 may be shut off when the room in which it is installed is not in use. From the wall switch the lead line 62 extends to and is connected with the binding post 35 on the thermostat 33. Binding post 34 of the thermostat is electrically connected as by electrical lead 65 to the binding post 31 of the heating element 30 and by electrical lead 66 to on end of a resistor 67. The other end of the resistor 67 is connected to one of two terminals of the indicator light socket 19. The other terminal of the indicator light socket 19 is connected to the other lead line 63. Binding post 32 of the heating element 30 is also electrically connected to the lead line 63 as by electrical lead line 68 to said other terminal of the indicator light socket 19.

*Operation*

To operate the instant, hot water dispenser 10 of this invention, assuming that the same is installed with the inlet coupling 27 coupled to a cold water supply pipe, and the electrical wiring connected, the lever arm 14 is pulled forwardly whereupon water enters the tank 21, filling it up, and then flows out through conduit 52, the valve 18 and discharge nozzle 13. When the air has been cleared out from the tank 21, the lever arm 14 is released, thereby shutting off the flow of water, and the wall switch 64 is turned to "on."

Immediately, electrical current starts to flow through the thermostat 33, through the heating element 30 and through the indicator light 15 which goes on. When the water in the tank 21 has reached the temperature established by the turning knob 36 of the thermostat 33, the thermostat switch between binding posts 34 and 35 opens, whereby the flow of current through the indicator light 15 and through the heating element 30 is stopped. The indicator light 15 thereupon goes out, indicating that the liquid in the tank 21 is at the desired temperature.

A cup containing the desired amount of instant coffee, instant tea, or the like, is placed under the end of the discharge nozzle 13 and the lever arm 14 is pulled, as indicated in FIG. 1. Hot water immediately flows out of the tank 21, through the valve 18, through the discharge nozzle 13 and into the cup. When the cup is full, the lever arm 14 is released. Because of the water pressure on the inlet end side of the valve body 42 acting on the inlet side surfaces thereof transversely arranged to the direction of flow of liquid through the first inner chamber 44, and because of the tension spring 54, the valve body 42 immediately seats against the valve seat 47, stopping the flow of water from the tank 21, and remains seated until the valve spindle 43 is again depressed into the valve housing 41 as by a pull on the lever arm 14.

As hot water flows out of the tank 21, cold water enters through the inlet conduit 25. Because of the relative positions of the inlet and outlet of the tank 21 and because of the manner in which the heating element 30 is positioned within the tank 21, relatively little mixture of the cold with the hot water occurs. Indeed, the cold water tends to form a layer on the bottom of the tank 21 and to gradually work upwardly to the top of the tank 21. Hence, the temperature of the hot water in the upper portion of the tank after one cup of hot water has been withdrawn therefrom may still be at the desired temperature. Consequently, another cup of water at the desired temperature can be withdrawn from the tank 21.

Upon the withdrawal of the second cup of water, or whatever quantity is necessary to lower the temperature at the top of the tank 21 to the degree at which the switch between the binding posts 34 and 35 of the thermostat 33 again closes the circuit, current is again supplied to the heating element 30 and heat is again conducted to the contents of the tank 21. This will be shown by the indicator light 15 which is on as long as current is supplied to the heating element 30. By providing an oversized heating element 30 and a tank 21 of small capacity, the time necessary for bringing the temperature of water within the tank 21 up to that desired will only take about a minute or so.

Thus, there is provided an instant hot water dispenser of small, compact, simple structure. Operation of the same is simple, semi-automatic, and economical. Moreover, the dispenser will not leak because of the water pressure biased valve and sealing structure involved therein.

While the dispenser 10 has been described as having only a two cup capacity, it can have more or less depending on what is desired. Generally speaking, the maximum capacity that anyone might desire is four, in view of the rapid recovery feature of the dispenser 10.

In addition, while the dispenser 10 has been mentioned as especially useful in hotels and motels, it will be recognized that the dispenser has utility elsewhere, for example, in the home. Moreover, the dispenser is not only useful in dispensing hot water but also other liquids which can withstand rapid heating and which are normally dispensed in heated condition.

These and other advantages will be apparent to those in the exercise of ordinary skill in the art after reading the foregoing description. Moreover, it will be seen that this invention may be embodied in several forms without departing from the spirit or essential characteristics thereof. Hence, the embodiment just described is to be regarded as illustrative and not restrictive since the scope of the invention is defined by the claims rather than by the description preceding them.

I claim:

1. An instant hot liquid dispenser comprising: oblong, closed tank means of small capacity having a longitudinal, normally horizontal axis, a first end and a second end, a top and a bottom, and an inlet and an outlet, said inlet being disposed in the region of said first end and comprising a closed end conduit extending into the interior of said tank means from said bottom and having a lateral, longitudinally aligned, conduit outlet, said outlet of said tank means being disposed in the region of said second end of said tank means and at the top thereof; heater element means in said tank means, said heater element means comprising a heater element disposed horizontally and longitudinally in the region of said bottom of said tank means and having a portion thereof in the region of said second end disposed vertically and in the region of said outlet of said tank means disposed horizontally and longitudinally; valve means having an inlet and an outlet; conduit means from said outlet of said closed tank means to said inlet of said valve means; and nozzle means coupled to said outlet of said valve means.

2. An instant hot liquid dispenser comprising: oblong, closed tank means of small capacity having a longitudinal, normally horizontal axis, a first end and a second end, a top and a bottom, and an inlet and an outlet, said inlet being disposed in the region of said first end and comprising a closed end conduit extending into the interior of said tank means from said bottom and having a lateral, longitudinally aligned, conduit outlet, said outlet of said tank means being disposed in the region of said second end of said tank means and at the top thereof; heater element means in said tank means, said heater element means comprising an electrical heating element disposed horizontally and longitudinally in the region of said bottom of said tank means and having a portion thereof in the region of said second end disposed vertically and in the region of said outlet of said tank means disposed horizontally and longitudinally, said heater element means also comprising thermostat means; valve means having an inlet and an outlet; conduit means from said outlet of said closed tank means to said inlet of said valve means; and nozzle means coupled to said outlet of said valve means.

3. An instant hot liquid dispenser comprising: oblong, closed tank means of small capacity having a longitudinal, normally horizontal axis, a first end and a second end, a top and a bottom, and an inlet and an outlet, said inlet being disposed in the region of said first end and comprising a closed end conduit extending into the interior of said tank means from said bottom and having a lateral, first end facing, conduit outlet, said outlet of said tank means being disposed in the region of said second end of said tank means and at the top thereof; heater element means in said tank means, said heater element means comprising an electrical heating element disposed horizontally and longitudinally in the region of said bottom of said tank means and having a portion thereof in the region of said second end disposed vertically and in the region of said outlet of said tank means disposed horizontally and longitudinally, said heater element means also comprising thermostat means; normally closed, liquid pressure biased, valve means having an inlet and an outlet, said valve means comprising a valve housing, an inner chamber in said housing with an inner peripheral, shoulder means, said inlet being on one side of said shoulder means and said outlet being on the other side of said shoulder means, valve body means on the inlet side of said shoulder means, said valve body means presenting a substantial inlet side surface for receiving liquid pressure forces acting in the general direction of flow of liquid through said chamber from said inlet to said outlet of said valve means, said valve body means having spindle means extending to the outside of said housing for moving said valve body away from said valve seat, spring means biasing said valve body into contact with said valve seat and lever arm means outside of said housing in contact with the outer end of said spindle means for depressing the same into said valve housing to move said valve body from said valve seat and pass liquid from said inlet through said chamber to said outlet; conduit means from said outlet of said closed tank means to said inlet of said valve means; and nozzle means coupled to said outlet of said valve means.

(References on following page)

References Cited in the file of this patent

UNITED STATES PATENTS

| | | |
|---|---|---|
| 1,138,593 | Mosteller | May 4, 1915 |
| 1,665,949 | Chambers | Apr. 10, 1928 |
| 1,715,899 | Combs | June 4, 1929 |
| 1,759,281 | Rosenberger | May 20, 1930 |
| 2,033,620 | Fowler | Mar. 10, 1936 |
| 2,080,724 | Littell | May 18, 1937 |
| 2,578,797 | Gordinier | Dec. 18, 1951 |
| 2,772,344 | Bowen et al. | Nov. 27, 1956 |
| 2,903,551 | Fischer | Sept. 8, 1959 |

FOREIGN PATENTS

| | | |
|---|---|---|
| 433,075 | Great Britain | Aug. 8, 1935 |